US012022229B2

(12) United States Patent
Hugosson

(10) Patent No.: US 12,022,229 B2
(45) Date of Patent: *Jun. 25, 2024

(54) SYSTEM AND METHOD FOR HANDLING DATA CAPTURED BY A BODY WORN CAMERA

(71) Applicant: Axis AB, Lund (SE)

(72) Inventor: Fredrik Hugosson, Lund (SE)

(73) Assignee: AXIS AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,455

(22) Filed: Mar. 29, 2023

(65) Prior Publication Data

US 2023/0269346 A1 Aug. 24, 2023

Related U.S. Application Data

(63) Continuation of application No. 17/335,637, filed on Jun. 1, 2021, now Pat. No. 11,632,515, which is a continuation of application No. 16/281,463, filed on Feb. 21, 2019, now Pat. No. 11,039,103.

(30) Foreign Application Priority Data

Mar. 19, 2018 (EP) .................................... 18162615

(51) Int. Cl.
| | |
|---|---|
| *H04N 5/77* | (2006.01) |
| *G08B 13/196* | (2006.01) |
| *H02J 7/00* | (2006.01) |
| *H04N 1/00* | (2006.01) |
| *H04N 7/18* | (2006.01) |

(Continued)

(52) U.S. Cl.
CPC ............. *H04N 5/77* (2013.01); *H02J 7/0044* (2013.01); *H04N 1/00127* (2013.01); *H04N 7/185* (2013.01); *H04N 23/54* (2023.01); *G08B 13/19621* (2013.01); *G08B 13/19654* (2013.01); *H04N 21/2743* (2013.01)

(58) Field of Classification Search
CPC .......... H04N 5/77; H04N 23/54; H04N 7/185; H02J 7/0044
USPC ...................................................... 348/231.3
See application file for complete search history.

(56) References Cited

U.S. PATENT DOCUMENTS

| | | | |
|---|---|---|---|
| 2016/0064036 A1* | 3/2016 | Chen .................... | H04N 21/239 386/241 |
| 2017/0153679 A1* | 6/2017 | Thompson ............ | G06F 3/0658 |

* cited by examiner

*Primary Examiner* — Joel W Fosselman
(74) *Attorney, Agent, or Firm* — Snyder, Clark, Lesch & Chung, LLP

(57) ABSTRACT

A system (1) for handling data captured by a body worn camera (2) is disclosed. The system (1) comprises a body worn camera (2), a docking station (3), and a recorder (4). The camera (2) comprises a local storage device (6). The docking station (3) comprises a data interface (7) for connecting the local storage device (6) to the docking station (3), and a first network interface (8) for connecting the docking station (3) to the recorder (4). The docking station is physically separate from the recorder. The recorder (4) comprises a second network interface (9) for connecting the recorder (4) to the docking station (3), and a recorder storage device (10). The recorder (4) is arranged to retrieve the captured data from the camera (2) and store it in the recorder storage device (10), and comprises a third network interface (11) for transfer of stored data to a data management system (5). A method for handling data captured by a body worn camera (2) is also disclosed.

20 Claims, 3 Drawing Sheets

(51) Int. Cl.
*H04N 21/2743* (2011.01)
*H04N 23/54* (2023.01)

SYSTEM AND METHOD FOR HANDLING DATA CAPTURED BY A BODY WORN CAMERA

CROSS-REFERENCE TO RELATED APPLICATIONS

This application is a continuation of application Ser. No. 17/335,637, filed Jun. 1, 2021, which is a continuation of application Ser. No. 16/281,463, filed Feb. 21, 2019, which claims priority to European Patent Application No. 18162615.1, filed Mar. 19, 2018, all of which are incorporated herein by reference.

TECHNICAL FIELD

The present invention relates to a system and method for handling data captured using a body worn camera. The captured data may be video data, as well as other data, such as audio data or meta data.

BACKGROUND

Body worn cameras are used, e.g., by police officers, for capturing video and other data during patrols and incidents. Such cameras may also be referred to as wearable cameras. Captured data may subsequently be needed as evidence when investigating crimes and prosecuting suspected criminals. In order to preserve such evidence, a data management system, such as a video management system or an evidence management system may be used. Such data management systems generally provide storage of captured data, and also viewing of the captured data, either in real time or as a playback of recorded data. Depending on the sophistication of the data management system, it may provide possibilities of linking data of many types to a case. For instance, video data of the same incident may have been captured by several cameras, body worn cameras as well as fixedly mounted surveillance cameras. Further, audio data may have been captured by some or all of those cameras, as well as by other audio devices. The video and audio data may be tagged, automatically and/or manually with meta data, e.g., geographical coordinates indicating where the data were captured. Additionally, physical evidence collected at a crime scene may be catalogued in the data management system, and documents about the case may be stored or referenced. The data management system may provide means of verifying the authenticity of video data and other data stored in the data management system.

There are different ways of transferring captured data from a body worn camera to the data management system. Some systems rely on more or less continuous wireless transfer of data from the camera to the data management system, e.g., located on a server in the police station. Some systems have docking stations, in which police officers returning to the police station place their body worn cameras for charging and data transfer. The docking station transfers the captured data from the cameras to the data management system, where it is stored for later use as evidence.

Each of these known approaches have advantages, but also disadvantages. For instance, continuous wireless transfer, over a mobile network or Wi-Fi, is vulnerable if the network connection fails. As the local storage capacity of the body worn camera is limited, it is necessary to ensure that data is securely transferred before it is overwritten by new captured data. In the docking station scenario, the data management system is generally not located in the same device as the docking station, meaning that also here, the system is dependent on a reliable network connection between the docking station and the data management system, or else valuable data may be lost. Further, the docking station is a relatively expensive component of the system, as it includes components for data transfer and storage, and as it needs to be robust for ensuring secure storage of data. Chargers of docking stations are prone to be worn by use, and eventually need to be replaced, thereby necessitating purchase of a new docking station. If the docking station and data management system are integrated in the same device, there is a security risk if the docking station is placed in an accessible area where it risks being stolen or sabotaged.

There is thus a need for improved methods and systems for handling data captured by body worn cameras.

SUMMARY OF THE INVENTION

It is an object of the present invention to provide a system for handling data captured by a body worn camera, which enables secure storage of the data. It is also an object of the invention to provide a system that is flexible regarding the number of body worn cameras supported by the system. Another object is to provide a system that is cost effective and easy to use.

Yet another object of the invention is to provide a method of handling data captured by a body worn camera that enables safe and secure storage of the data. A further object is to provide a method that is easily scalable, easy to use, and cost effective.

According to a first aspect, these and other objects are achieved, in full or at least in part, by a system for handling data captured by a body worn camera, the system comprising: a body worn camera, a docking station, and a recorder, wherein: the camera comprises a local storage device, the docking station comprises a data interface for connecting the local storage device to the docking station, the docking station comprises a first network interface for connecting the docking station to the recorder, the recorder comprises a second network interface for connecting the recorder to the docking station, the docking station is physically separate from the recorder, the recorder comprises a recorder storage device, the recorder is arranged to retrieve the captured data from the camera and store it in the recorder storage device, the recorder comprises a third network interface for transfer of stored data to a data management system, and the recorder comprises a camera configuration module for configuring operational parameters of the camera. With such a system, it is possible to use a docking station with minimal or no intelligence, only providing a connector necessary for being able to transfer data from the camera to the recorder. The docking station may thereby be made quite inexpensive, making it possible to have as many docking station as necessary or convenient for the number of body worn cameras used. Further, the cost of replacing a worn out docking station may be kept low. Additionally, a low cost docking station with minimal intelligence makes it relatively safe to keep the docking station in an easily accessible area, where users of the body worn cameras can easily place and retrieve the body worn cameras, such as in an open office area of a police station. The cost of making an essentially "dumb" docking station rugged is also lower than it would be to make a more sophisticated docking station including storage rugged. Cameras that have recently been used and are placed in the docking station may be dirty and wet, making it necessary to design the docking station with IP rated protection against particles and liquids. The incorporation of a recorder for intermediate storage of captured data makes the system more secure and reliable. The docking station may be connected to the recorder over a local area network, or LAN for short, e.g., using an Ethernet cable. Even if the docking station is placed in an easily accessible area, the recorder may be placed in a secure area, such as a locked server room. In this way, data stored in the recorder may be kept safe. Further, by using an intermediate storage in the recorder, the system is not as vulnerable to network failure and problems with network capacity as prior art systems. Data captured by the body worn camera is retrieved by the recorder from the camera and stored in the recorder storage device. The data management system, such as a video management system or an evidence management system, may then request stored data from the recorder. In this manner, even if the connection to the data management system were to fail, no data would be lost, as it would already be stored in the recorder. The use of a separate recorder, that is arranged to retrieve data from the body worn camera in the docking station, makes it possible to have a passive docking station, with little or no intelligence, only providing the necessary interface or connectors for allowing transfer of data from the camera to the recorder. This in turn makes the system flexible in terms of the number of body worn cameras it can support. As many docking stations as necessary may be used in the system without adding much cost. One recorder may serve several docking stations. As the docking station is more prone to wear than the recorder, it is advantageous that replacement of a docking station need not entail high cost. Further, by using a recorder for intermediate storage of captured data, the system may be made flexible in terms of what data management system may be used. Many prior art systems are integrated in a way that they tie the user to one specific data management system, and if the user desires to use another data management system, the entire system, including cameras, needs to be replaced. The recorder may use one or more openly available communication protocols, such that any data management system may be used for viewing and retaining captured data. The recorder may allow installation of applications for supporting one or more particular data management systems. As noted above, the recorder comprises a camera configuration module for configuring operational parameters of the camera. Operational parameters may be parameters such as resolution or frame rate at which video is captured, how light indicators on the camera are to be used, if the user is allowed to turn of recording or not, if the camera is to operate in so called stealth mode with no outward signs of recording, if audio is to be captured or not, etc.

It should be pointed out that as used herein, the term "body worn camera" refers to a type of camera that is suitable for wearing on the body, and it is not limited to the situation when the camera is actually worn on the body. Thus, when the camera is removed from the body of the user, and placed in the docking station, it is still a body worn camera. This type of camera may also be referred to as a wearable camera. Although the description of the invention will mainly make reference to use by the police, such cameras may find use in many fields. In some of those fields, such as for police and other first responders, it is important to retain data for later use as evidence or for other investigations. Still, body worn or wearable cameras may also be used, e.g., in sports, in health care, in elderly care, in child care, or in pet monitoring, and also there, the user may have a desire to safely and easily save the captured data for later review.

The system may further comprise the data management system, wherein the data management system is a video management system or an evidence management system. Many video management systems and evidence management systems are available and may be chosen based on the needs of the users of the system. Regardless of what data management system is used, it is advantageous to be able to ensure that captured data is safely stored.

In some embodiments of the system, the camera comprises a chargeable battery, and the docking station comprises a charging interface for charging the camera battery. In this manner, the camera may be charged at the same time as captured data is transferred to the recorder.

The recorder may be arranged to initiate erasing of the local storage device upon determining that the captured data has been stored in the recorder storage device. By erasing data from the camera only when it has been ensured that the data is safely stored for later use, loss of data may be avoided. Further, by automatically erasing data from the camera once the data has been stored in the recorder, the camera is made ready for new use.

Transfer of data from the recorder to the data management system may be initiated in one of several ways. For instance, the recorder may be arranged to transfer stored data to the data management system upon determining that new data has been stored. In this manner, as soon as captured data has been transferred to the recorder, transfer of those data to the data management system may be initiated, such that the data management system is always up to date. This also minimises the risk that the recorder storage device becomes full before all data has been transferred to the data management system.

Alternatively or additionally, the recorder may be arranged to transfer stored data upon request from the data management system. In this way, data may be transferred when the data management system is ready to receive it, thereby avoiding trying to transfer data when the data management system is busy or unavailable.

Alternatively or additionally, the recorder may be arranged to transfer stored data to the data management system based on a time schedule. Thereby, data transfer may be scheduled for times of the day or the week when there is more available capacity in the network connecting the recorder to the data management system.

In some embodiments, the recorder may also be used for device management, such as registering a new body worn camera in the system or assigning body worn cameras to different users or user groups. The recorder may provide an easy to use interface for configuration and device management, which may be impractical to perform locally on the camera or remotely in the data management system. The recorder may also be used for managing users and user groups.

The recorder may comprise a camera upgrade module for upgrading software and/or firmware of the camera. Similar to the configuration module, the camera upgrade module may provide an easy to use interface for upgrading the camera when new firmware or software is available.

In some embodiments, the recorder comprises a health monitoring module for monitoring at least one health indicator of the camera. The health indicator may for example be a status of a chargeable battery in the camera. Thereby, the user may be alerted if the battery is starting to lose capacity and will need to be replaced soon.

According to a second aspect, the abovementioned objects are achieved, in full or at least in part, by a method for handling data captured by a body worn camera, the method comprising the steps of: connecting the camera to a data interface of a docking station, connecting the docking station to a physically separate recorder, transferring captured data from the camera to the recorder, storing the captured data in the recorder, transferring stored data from the recorder to a data management system via a network interface of the recorder, the method further comprising configuring, using the recorder, operational parameters of the camera. With such a method, it is possible to ensure safe and secure storage of captured data. By intermediate storage of captured data in the recorder, network failure between the camera and the data management system is of less concern than in prior art systems. Additionally, the requirements on network capacity and bandwidth for connection to the data management system is not as critical. As earlier mentioned, operational parameters may be parameters such as resolution or frame rate at which video is captured, how light indicators on the camera are to be used, if the user is allowed to turn recording off or not, if the camera is to operate in so called stealth mode with no outward signs of recording, if audio is to be captured or not, etc.

The method may further comprise: connecting the camera to a charging interface of the docking station, and charging a chargeable battery of the camera. Hereby, simultaneous charging and data transfer may be achieved, thereby saving time for the user.

In some variants, the method further comprises erasing captured data from the camera upon determining that the captured data has been stored in the recorder. It may in this way be ensured that the camera is made ready for new use, while also ensuring that no captured data is lost.

The recorder may also be used for device management, such as registering a new body worn camera in the system or assigning body worn cameras to different users or user groups. The recorder may provide an easy to use interface for configuration and device management, which may be impractical to perform locally on the camera or remotely in the data management system.

The method may further comprise upgrading, using the recorder, firmware or software of the camera.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
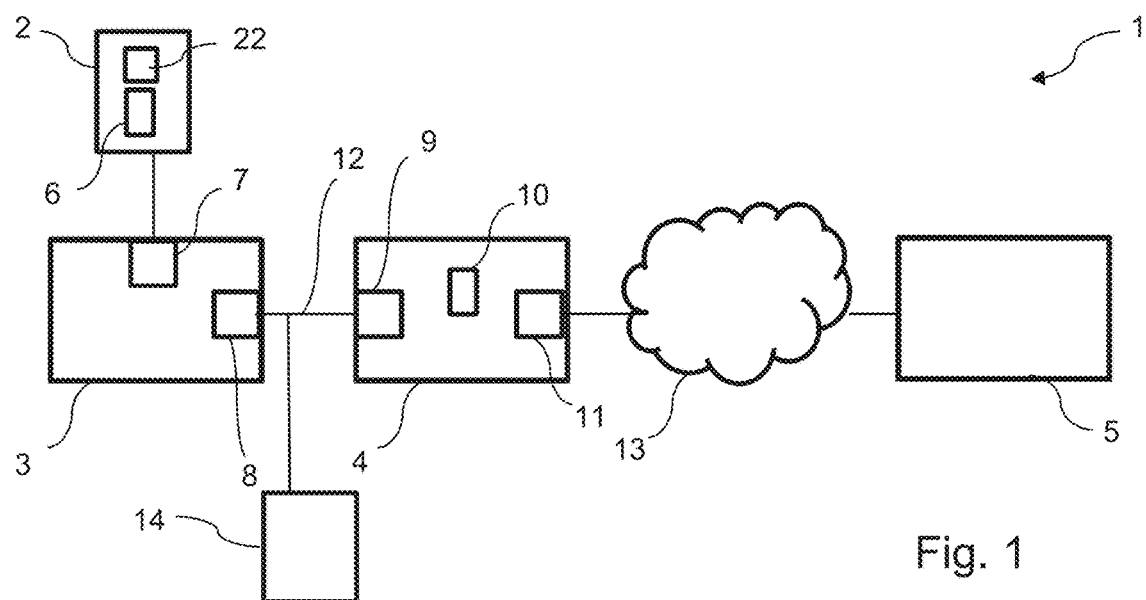
FIG. 1 is a block diagram of an embodiment of an inventive system.

FIG. 1 shows an embodiment of a system 1 for handling data captured by a body worn camera. The system 1 comprises a body worn camera 2, a docking station 3, a recorder 4, and a data management system 5. The camera 2 has a local storage device 6, which may be in the form of an SD card reader and an SD card. The docking station 3 has a data interface 7 for connecting the local storage device 6 of the camera 2 to the docking station 3. Further, the docking station 3 has a first network interface 8 for connecting the docking station 3 to the recorder 4.

The recorder 4 has a second network interface 9 for connecting the recorder 4 to the docking station 3. Additionally, the recorder 4 has a recorder storage device 10. The recorder storage device 10 may, for instance, be a hard disk drive. The recorder 4 is arranged to retrieve the captured data from the camera 2 and store them in the recorder storage device 10, as will be discussed in further detail later. The recorder 4 also has a third network interface 11 for transfer of stored data to the data management system 5. The second network interface 9 and the third network interface 11 may be two logically different interfaces arranged in one and the same physical interface. However, for achieving a high data capacity for transfer from the camera 2 to the recorder, it will generally be beneficial to have the second and third network interfaces 9, 11 arranged as physically separate components, especially if the docking station can house several cameras 2 at a time. This will also make it possible to provide high data capacity for transfer of data from the recorder to the data management system 5.

Figure 2:
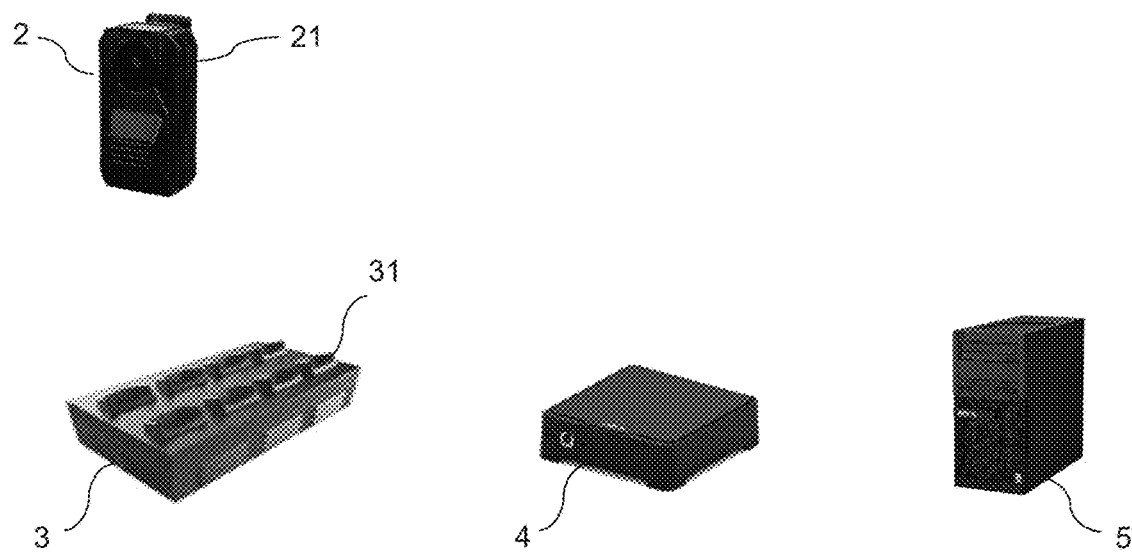
FIG. 2 is a perspective view of components that may be used in the system of FIG. 1.

In FIG. 2, examples of the components of the system 1 may be seen in perspective view.

Further details of the system, as well as methods of handling data captured by the body worn camera 2 will be described in the following.

The body worn camera 2 may, for instance, be used by a police officer. On patrols, the police officer may use the camera 2 for continuous recording. However, continuous recording requires high capacity of the local storage device, and most of the time the captured data will not be of much interest. Therefore, it is usually preferable to record only on demand. To this end, the camera 2 has an activation button 21, which the police officer can easily activate and deactivate when desired. The camera may also have sensors, such as an accelerometer and a gyro (not shown), which may be used for automatic activation of recording based on movement of the camera 2, indicating movement of the police officer. For instance, if the police officer starts to run, recording may be started, as running may indicate that the police officer is in pursuit of a suspect. Recording may also be started if the police officer falls, such as in the case of injury or ducking for cover. When the work shift is over, the police officer returns to the police station, takes off the camera 2, and places it in a slot 31 of the docking station 3. The camera 2 is thereby connected to the data interface 7 and to a charging interface 32 in the docking station 3. Hereby, a battery 22 in the camera 2 starts charging. Via a LAN 12, the docking station 3 is connected to the recorder 4. This may be achieved by establishing an Ethernet connection, e.g., by connecting an Ethernet cable, between the first network interface 8 of the docking station 3 and the second network interface 9 of the recorder 4. The LAN 12 may also be more extensive, including a switch (not shown) for enabling connection of other devices. The recorder 4 can now pull captured data from the local storage device 6 of the camera 2, and store the data in the recorder storage device 10. Once the recorder 4 has determined that it has stored all the captured data that were recorded in the local storage device 6, the recorder 4 sends a signal to the camera 2, instructing the camera 2 to erase the captured data from the local storage device 6. Thereby, the local storage device 6 is ready to be used for recording on a new work shift. As soon as the battery 22 is charged, the camera 2 is then ready for use.

By storing the captured data in the recorder storage device 10, the captured data is safely retained, even if the connection to the data management system 5 should fail.

The recorder 4 may push stored data to the data management system 5 as soon as it has been stored in the recorder storage device. It is also possible to have the data management system 5 pull stored data from the recorder storage device 10 when the data management system 5 requires the data. It is also possible to set up a schedule for pushing or pulling stored data from the recorder storage device 10 to the data management system 5, such that data transfer between the recorder 4 and the data management system 5 is performed at times of little other data traffic.

The data management system 5 may be installed on a server located in the police station or remotely. No matter what approach is used for transferring stored data from the recorder 4 to the data management system 5, the recorder 4 may be connected by the third network interface 11 to the data management system 5 via a wired or wireless network 13. This network 13 may be a local or wide area network, and it may be the internet. Once the data has reached the data management system 5, it may be stored there in addition to in the recorder 4. The stored data in the recorder 4 may be retained for a predetermined period of time. It is also possible to have the data management system 5 transmit a signal to the recorder 4 when it has been determined that the stored data has been safely received and stored in the data management system 5, such that the stored data may be erased or overwritten in the recorder storage device 10 without loss of data. The recorder 4 may transfer data to several data management systems, e.g., for backup.

Figure 3:
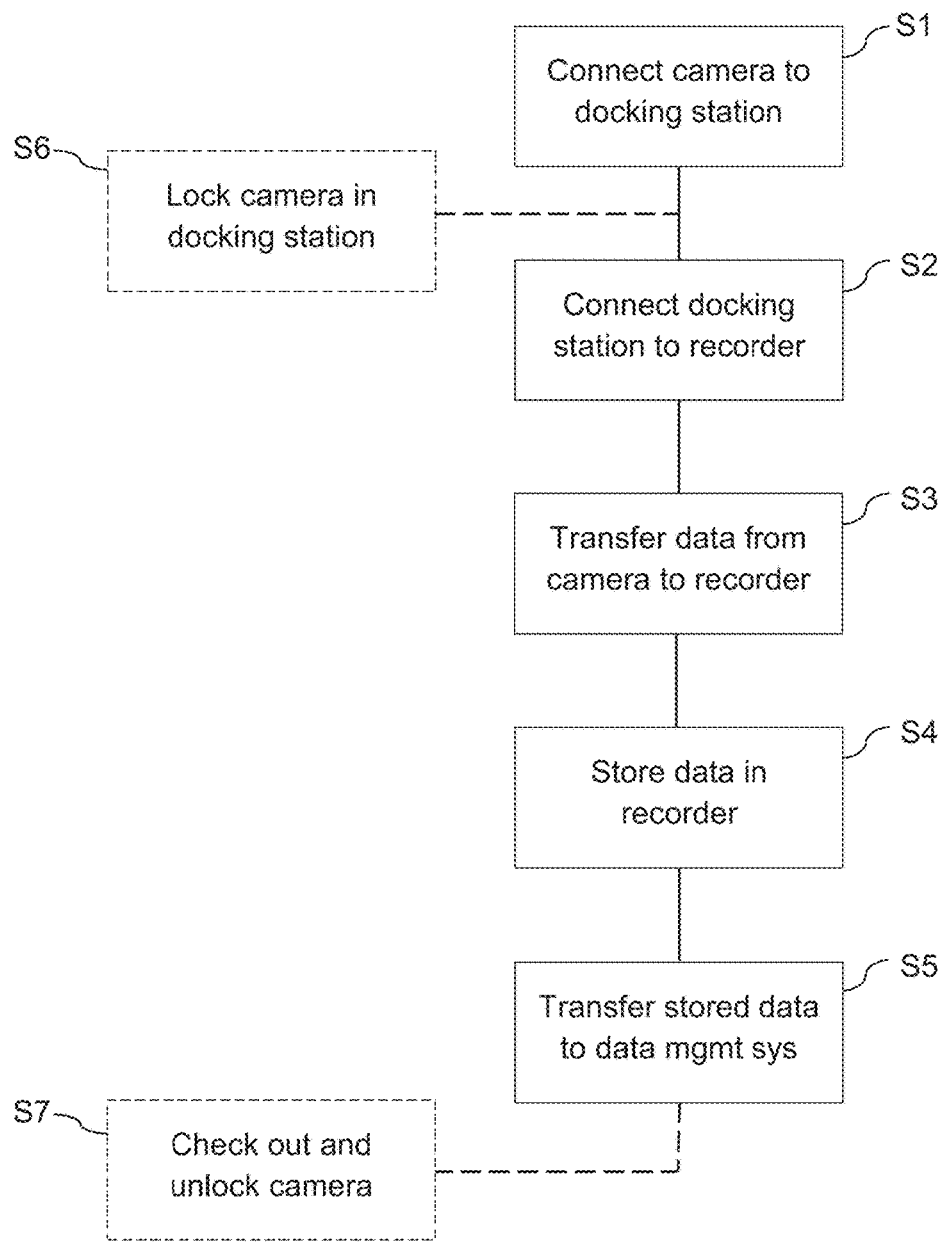
FIG. 3 is a flow chart of a variant of an inventive method for handling data captured by a body worn camera.

The method by which the system may be operated will now be summarised with reference to FIG. 3. In step S1, the body worn camera 2 is connected to a data interface 7 of a docking station 3. In step S2, the docking station 3 is connected to a recorder 4. This may have been done before the camera 2 is connected to the data interface 7. In step S3, captured data is transferred from the camera 2 to the recorder 4. In step S4, the captured data is stored in the recorder 4. In step S5, the stored data is transferred from the recorder 4 to a data management system 5 via a network interface 11 of the recorder 4.

Figure 4:
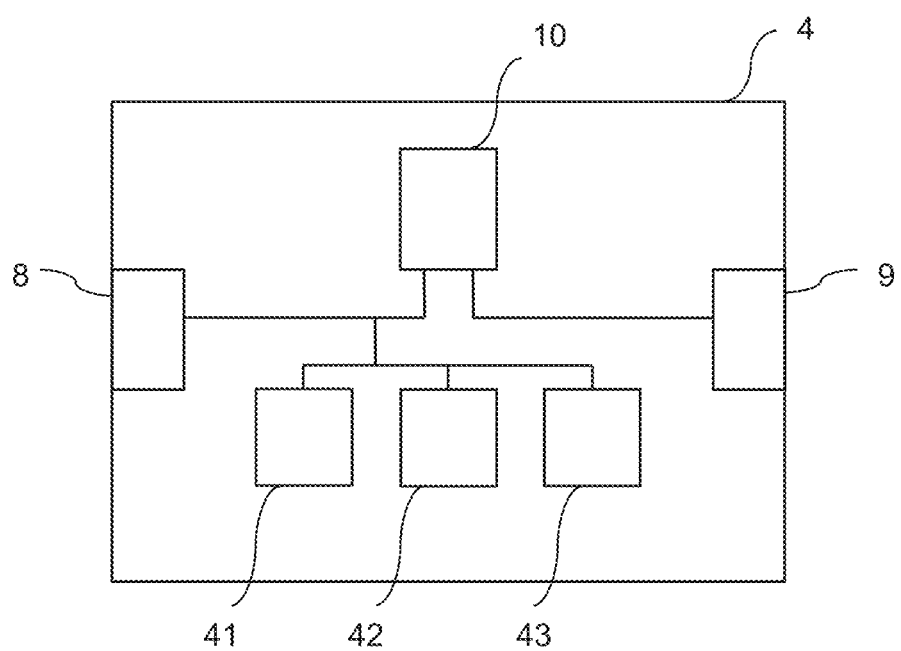
FIG. 4, is a block diagram of a recorder of FIG. 1.

With reference to FIG. 4, some additional possibilities that may be provided by the recorder 4 will be discussed. The recorder may provide an interface for device management, for firmware and software upgrading, and for health monitoring. To this end, the recorder 4 in the example shown has a camera configuration module 41 for configuring operational parameters of the camera 2. Using the configuration module 41, the owner of the system 1 may register new body worn cameras in the system, register new users in the system, assign users to user groups, assign cameras to users or user groups, set parameters for capturing, such as frame rate and resolution, set parameters for recordings, such as pre-buffer time, set rules for how indicators on the camera are to be used and how the camera is to indicate that recording has started, rules for whether the user is allowed to switch recording off, rules for whether audio is to be recorded, etc. It may be more practical to make such configuration in a user interface provided by the recorder than to do this in a user interface provided by the cameras themselves. For instance, the configuration module 41 may allow configuring several cameras at once, making it unnecessary for the system owner to access one camera at a time for configuration. The recorder 4 may keep a database of cameras, users, user groups, etc. Additionally or alternatively, such a database may be kept in the data management system and be accessed and updated by the recorder 4. Additionally or alternatively, such a database may be kept in a separate device management system stored locally in the recorder or on a remote server. The recorder may access and update the device management database as necessary.

In the example shown, the recorder 4 also has a camera upgrade module 42 for upgrading software and/or firmware of the camera. The camera upgrade module of the recorder 4 may periodically check if there is new software or firmware available for the cameras 2 in the system 1, download the software or firmware, and provide it to the cameras 2 for installation. This may be done while the cameras are being charged in the docking station 3. Hereby, the cameras may be kept up to date in a convenient way. Checking for new firmware or software, and installation on the cameras may be automated, but it is also possible to provide a user interface by which a user or owner of the system 1 may initiate upgrades manually.

Further, the recorder 4 shown has a health monitoring module 43 for monitoring at least one health indicator of the camera 2. Such a health indicator may be a status of the battery 22. In this way, the health monitoring module 43 may alert the user of a camera 2 or the owner of the system 1 when the battery 22 has lost a predetermined portion of its capacity, such that the battery 22 may be replaced before it loses so much capacity that it will not last a work shift. The health monitoring module 43 may also monitor the status of the local storage device 6. If an SD card is used for local storage, it will generally be useful for a limited number of cycles of writing and erasing captured data. The health monitoring module 43 may simply keep track of the number of times the SD card of an individual camera 2 has been rewritten and alert the user of the camera 2 or the owner of the system 3 when it is nearing time to replace the SD card. In other embodiments, the health monitoring module 43 may run a test on the SD card at each reading and erasing of captured data to determine the status of the SD card. The health monitoring module 43 may with these approaches reduce the risk of data loss.

The user interfaces of the configuration module 41, the upgrade module 42, and the health monitoring module 43 may be provided directly on the recorder 4 in the form of a display and/or in the form of buttons on the housing. However, it will in most cases be preferable to have a user interface that is instead accessible by connecting a computer, such as a laptop computer, to the recorder 4.

The configuration module 41, the upgrading module 42, and the health monitoring module 43 may be implemented in hardware, firmware, or software, or as a combination thereof.

Returning to FIG. 1, the system 1 may also be equipped with a camera checkout device 14 connected to the recorder 4 via the LAN 12. This may be particularly useful if each user of the system does not have a personal camera, but cameras may be shared among several users. The checkout device 14 may have a card reader, a tag reader, a pin pad, or any other means of identifying a user, e.g., a biometric identification system. The docking station 3 may be provided with a lock, such as a magnetic lock or a mechanical lock interacting with a lock portion of the camera. When a user is identified, the recorder 4 may access a user database to ascertain if the user is authorised to take a camera. If users of the system are assigned to different user groups, such as patrol officers and SWAT team, the recorder may ascertain which user group the user belongs to. Different user groups may have different configurations for the camera. For instance, for one group of users, the camera may record in stealth mode, whereas it does not for users of another group. Once it has been determined which group the user belongs to, the relevant configuration may be transferred from the recorder 4 to a designated camera 2 connected in the docking station 3. The recorder 4 may choose which camera to designate, e.g., based on how long the cameras have been in the docking station, such that it may be ensured that the user will get a fully charged camera with empty local storage 6. If the recorder 4 includes a health monitoring module 43, the choice of designated camera may also be based on that the camera should be in good health. When the designated camera 2 is ready for use, a light indicator may be turned on next to the slot 31 in which that camera 2 is placed or on the camera 2, telling the user which camera 2 to pick up. The recorder 4 may also send a signal to the designated camera 2, and upon receipt of that signal, the camera 2 will unlock the lock that locks the camera 2 in the slot 31. The locking and unlocking of the lock may be performed over a specially designated pin in the connection interface between the camera 2 and the docking station, or the locking and unlocking signal may be superimposed on the data signal carried by other pins used for data transfer and/or charging. When a camera 2 is replaced in the docking station 3, it is once more locked in place and may be automatically checked back in. It may in some instances be useful to require the user to once more be identified when returning the camera, such that it can be ensured that the same user checked the camera out and back in. The recorder 4 may keep a log of users, and may keep track of who has checked out a camera, when it was checked out and when it was returned. Such logs may be transferred, e.g., to the data management system. It may be seen that checkout and check-in of cameras may be performed by the recorder 4 and the camera 2, not requiring any intelligence in the docking station 3.

If such a checkout function is used, two further steps may be added in the method illustrated in FIG. 3. Thus in step S6, the camera is locked in the docking station, and in step S7, the camera is checked out and unlocked.

It will be appreciated that a person skilled in the art can modify the above described embodiments in many ways and still use the advantages of the invention as shown in the embodiments above. As an example, the camera 2 may be divisible, such that the battery and the local storage device are arranged in a part that can be removed from the remaining camera. Thereby, a battery/storage part that needs recharging and data dumping may be placed in the docking station, and be replaced by another battery/storage part that has been charged and data dumped, such that the camera is immediately ready for new use. It is also possible to have only the battery or the local storage device in a removable part of the camera, or to have the battery and the local storage in separate removable parts. With such arrangements, charging of the battery may be performed separate from data transfer.

The camera may be provided with a Bluetooth interface for communication with, e.g., equipment in a police car, thereby enabling automatic triggering of recording for instance when sirens of the car are switched on. The camera may also be equipped with a Wi-Fi or cellular network interface for communication with a mobile phone or PDA used by the police officer. This may for example enable viewing of recently recorded video data, as well as manual tagging of such video data with notes made by the police officer.

Further, the camera may be provided with a geographic location system, such as a GPS system Thereby, a location of the camera may be determined. This may be used for tagging captured data, and could also be used for locating a camera if it is lost or if the user has not reported back when expected.

Thus, the invention should not be limited to the shown embodiments but should only be defined by the appended claims.

The invention claimed is:

1. A system comprising:
   a docking station configured to receive a chargeable battery and a local storage device of a body worn camera,
     wherein the docking station includes a docking station housing, and
     wherein the chargeable battery and the local storage device are configured to be removable from the body worn camera; and
   a recorder having a recorder housing, wherein the recorder is physically separate from and housed separately from the docking station,
     wherein the docking station comprises a data interface configured to connect the local storage device to the docking station and to receive captured data, generated by the body worn camera and stored in the local storage device, through the data interface from the local storage device,
     wherein the docking station comprises a first network interface configured to connect the docking station to the recorder and to send the captured data through the first network interface to the recorder,
     wherein the recorder comprises a second network interface configured to connect the recorder to the docking station and to receive the captured data through the second network interface from the docking station,
     wherein the recorder comprises a recorder storage device configured to store the captured data,
     wherein the recorder is configured to retrieve the captured data from the local storage device through the data interface, the first network interface, and the second network interface and to store the captured data in the recorder storage device, and
     wherein the recorder comprises a third network interface configured to transfer the captured data stored in the recorder storage device to a data management system.

2. The system according to claim 1, wherein the recorder is physically separate from and housed separately from the docking station such that the recorder and the recorder housing are configured to be placed in a separate room from the docking station and the docking station housing.

3. The system according to claim 2, wherein the second network interface and the third network interface are configured as physically separate components.

4. The system according to claim 2, wherein the first network interface and the second network interface are wired interfaces for connecting the docking station to the physically separate and separately housed recorder.

5. The system according to claim 2, wherein the docking station provides only necessary interfaces and connectors for allowing transfer of data from the chargeable battery or the local storage device to the recorder.

6. The system according to claim 2, wherein the docking station includes a lock to lock the chargeable battery into the docking station.

7. The system according to claim 6, wherein the recorder is configured to send a lock signal or an unlock signal through the second network interface, to the first network interface of the docking station, to lock or unlock the chargeable battery in the docking station.

8. The system according to claim 7, wherein the recorder is configured to determine a user and send the lock signal or unlock signal based on the user.

9. The system according to claim 1, wherein:
the docking station comprises a charging interface for charging the chargeable battery,
the docking station is configured to house several chargeable batteries and local storage devices configured to be removable from body worn cameras, and
the recorder comprises a health monitoring module for monitoring a charge status for each of the several chargeable batteries.

10. The system according to claim 9, wherein:
the recorder is configured to select one of the several chargeable batteries for a user based on the charge status for each of the several chargeable batteries, and
the docking station includes an indicator light and is configured to indicate the one of the several chargeable batteries selected with the indicator light.

11. The system according to claim 1,
wherein the recorder comprises a camera configuration module for configuring operational parameters,
wherein the recorder is configured to transfer a configuration of the operational parameters through the second network interface of the recorder and the first network interface of the docking station and through the data interface to the local storage device, and
wherein the recorder is configured to determine a user and to determine the configuration of the operational parameters based on the determined user and transfer the configuration of the operational parameters to the battery/storage part.

12. A system comprising:
a docking station configured to receive a body worn camera,
wherein the docking station includes a docking station interface and a docking station housing, and
wherein the docking station includes a lock to secure the body worn camera to the docking station,
a recorder having a recorder housing, wherein the recorder is physically separate from and housed separately from the docking station,
wherein the docking station interface includes a data interface configured to connect the camera to the docking station and to receive captured data, generated by and stored in the camera, through the data interface from the camera,
wherein the docking station comprises a first network interface configured to connect the docking station to the recorder and to send the captured data through the first network interface to the recorder,
wherein the recorder comprises a second network interface configured to connect the recorder to the docking station and to receive the captured data through the second network interface from the docking station,
wherein the recorder comprises a recorder storage device configured to store the captured data,
wherein the recorder is configured to retrieve the captured data from the camera through the data interface, the first network interface, and the second network interface and to store the captured data in the recorder storage device,
wherein the recorder comprises a third network interface configured to transfer the captured data stored in the recorder storage device to a data management system,
wherein the recorder is configured to send an unlock signal to the body worn camera to unlock the body worn camera, and
wherein the docking station is configured to unlock the body worn camera in response to receiving a command through the docking station interface from the body worn camera.

13. The system of claim 12, wherein the docking station interface includes a pin, and wherein the docking station is configured to unlock the body worn camera upon receipt of the command through the pin of the docking station interface from the body worn camera.

14. The system of claim 12,
wherein the recorder is configured to send the unlock signal through the second network interface, to the first network interface of the docking station, to the body worn camera to unlock the body worn camera, and
wherein the docking station is configured to send the unlock signal from the first network interface of the docking station to the body worn camera through connections without providing intelligent processing.

15. The system of claim 14,
wherein the docking station is configured to house several body worn cameras;
wherein the docking station includes several locks, wherein each lock is configured to secure a corresponding body worn camera to the docking station; and
wherein the recorder is configured to determine a user and send an unlock signal, based on the user, to one of the several body worn cameras to unlock the one of the several body worn cameras.

16. The system according to claim 12,
wherein the recorder is configured to determine a user and to determine a configuration of operational parameters based on the determined user and transfer the configuration of the operational parameters to through the second network interface of the recorder and the first network interface of the docking station and through the data interface.

17. The system according to claim 12,
wherein the recorder comprises a health monitoring module for monitoring a charge status for the body worn camera.

18. The system according to claim 12, further comprising several body worn cameras, wherein:

the docking station is configured to handle the several body worn cameras;

the recorder is configured to select one of the several body worn cameras for a user based on the charge status for each of the several body worn cameras, and the docking station includes an indicator light and is configured to indicate the one of the several body worn cameras selected with the indicator light.

19. The system of claim 12, wherein the recorder comprises a camera configuration module for configuring operational parameters of the camera, wherein the recorder is configured to transfer a configuration of the operational parameters through the first network interface and the second network interface to the docking station and through the data interface to the camera.

20. Non-transitory computer-readable storage media comprising instructions that, when executed by a processor, cause the processor to:

receive captured data, generated and stored in a body-worn camera, in a docking station through a data interface from the body-worn camera, wherein the docking station is configured to receive the body-worn camera, wherein the docking station includes a docking station housing, wherein the docking station includes the data interface to connect the body-worn camera to the docking station, and wherein the docking station includes a first network interface configured to connect the docking station to a recorder;

send the captured data through the first network interface to the recorder, wherein the recorder includes a recorder housing, wherein the recorder is physically separate from and housed separately from the docking station, and wherein the recorder comprises a second network interface configured to connect the recorder to the docking station;

receive the captured data in the recorder through the second network interface from the docking station, wherein the recorder comprises a recorder storage device;

store the captured data retrieved from the body-worn camera through the data interface, the first network interface, and the second network interface in the recorder storage device; and transfer the captured data stored in the recorder storage device to a data management system, wherein the recorder comprises a third network interface to transfer the captured data stored in the recorder storage device to the data management system.

* * * * *